United States Patent [19]
Imamura

[11] Patent Number: 5,336,873
[45] Date of Patent: Aug. 9, 1994

[54] PHOTOGRAPHIC FILM HAVING FRAME NUMBER BAR CODES

[75] Inventor: Takashi Imamura, Kanagawa, Japan

[73] Assignee: Fuji Photo Film Co., Ltd., Kanagawa, Japan

[21] Appl. No.: 168,358

[22] Filed: Dec. 17, 1993

Related U.S. Application Data

[60] Continuation of Ser. No. 941,328, Sep. 4, 1992, abandoned, which is a division of Ser. No. 826,191, Jan. 21, 1992, Pat. No. 5,179,266, which is a continuation of Ser. No. 446,263, Dec. 5, 1989, abandoned.

[30] Foreign Application Priority Data

Dec. 5, 1988 [JP] Japan .................. 63-307607

[51] Int. Cl.$^5$ .................................. G06K 7/10
[52] U.S. Cl. ........................... 235/462; 235/454; 355/40
[58] Field of Search .......... 235/454, 462; 355/40, 355/41, 70

[56] References Cited

U.S. PATENT DOCUMENTS

| | | | |
|---|---|---|---|
| 4,577,961 | 3/1986 | Terashita | 355/77 |
| 4,797,713 | 1/1989 | Terashita et al. | 355/77 |
| 4,914,471 | 4/1990 | Saeki et al. | 355/40 |
| 4,918,484 | 4/1990 | Ujiie et al. | 355/41 |
| 4,961,086 | 10/1990 | Takenaka | 355/41 |
| 4,965,628 | 10/1990 | Olliver et al. | 355/41 |
| 5,122,645 | 6/1992 | Saeki et al. | 235/462 |

*Primary Examiner*—Harold Pitts
*Attorney, Agent, or Firm*—Sughrue, Mion, Zinn, Macpeak & Seas

[57] ABSTRACT

A photographic film is provided with bar codes indicating frame numbers attached to respective frames of the photographic film and a specific bar code indicating a specific part thereof. The specific bar code is located before or after the specific part of the photographic film. Each frame number bar code is read to determine the decimal frame number of each frame of the photographic film. If the bar code attached to the last frame is not read, it is determined that the bar code not read indicates a frame number for the last frame by reading the specific bar code before or after the fault in reading the bar code of the last frame.

17 Claims, 12 Drawing Sheets

| FRAME NUMBER | BAR | SPACE | PATTERN |
|---|---|---|---|
| XX | | | |
| XXA | | | |
| X | | | |
| XA | | | |
| 00 | 1:00000:0 | 0:0111:0 | |
| 00A | 1:00000:0 | 0:1011:0 | |
| 0 | 1:11000:0 | 0:0001:0 | |
| 0A | 1:10100:0 | 0:0001:0 | |
| 1 | 1:01100:0 | 0:0001:0 | |
| 1A | 1:10010:0 | 0:0001:0 | |
| 2 | 1:01010:0 | 0:0001:0 | |
| 2A | 1:00110:0 | 0:0001:0 | |
| 3 | 1:11000:0 | 0:0010:0 | |
| 3A | 1:10100:0 | 0:0010:0 | |
| 4 | 1:01100:0 | 0:0010:0 | |
| 4A | 1:11000:0 | 0:0100:0 | |
| 5 | 1:11000:0 | 0:1000:0 | |
| 5A | 1:10100:0 | 0:0100:0 | |
| 6 | 1:01100:0 | 0:0100:0 | |
| 6A | 1:10100:0 | 0:1000:0 | |
| 7 | 1:01100:0 | 0:1000:0 | |
| 7A | 1:10010:0 | 0:0010:0 | |
| 8 | 1:01010:0 | 0:0010:0 | |
| 8A | 1:00110:0 | 0:0010:0 | |
| 9 | 1:10010:0 | 0:0100:0 | |
| 9A | 1:01010:0 | 0:0100:0 | |

FIG. 5B

| FRAME NUMBER | BAR | SPACE | PATTERN |
|---|---|---|---|
| 10 | 1:10010:0 | 0:1000:0 | |
| 10A | 1:01010:0 | 0:1000:0 | |
| 11 | 1:00110:0 | 0:0100:0 | |
| 11A | 1:00110:0 | 0:1000:0 | |
| 12 | 1:10001:0 | 0:0001:0 | |
| 12A | 1:01001:0 | 0:0001:0 | |
| 13 | 1:00101:0 | 0:0001:0 | |
| 13A | 1:00011:0 | 0:0001:0 | |
| 14 | 1:10001:0 | 0:0010:0 | |
| 14A | 1:01001:0 | 0:0010:0 | |
| 15 | 1:00101:0 | 0:0010:0 | |
| 15A | 1:10001:0 | 0:0100:0 | |
| 16 | 1:01001:0 | 0:0100:0 | |
| 16A | 1:10001:0 | 0:1000:0 | |
| 17 | 1:01001:0 | 0:1000:0 | |
| 17A | 1:00101:0 | 0:0100:0 | |
| 18 | 1:00101:0 | 0:1000:0 | |
| 18A | 1:00011:0 | 0:0010:0 | |
| 19 | 1:00011:0 | 0:0100:0 | |
| 19A | 1:00011:0 | 0:1000:0 | |
| 20 | 1:10000:0 | 0:0011:0 | |
| 20A | 1:01000:0 | 0:0011:0 | |
| 21 | 1:00100:0 | 0:0011:0 | |
| 21A | 1:10000:0 | 0:0101:0 | |
| 22 | 1:01000:0 | 0:0101:0 | |
| 22A | 1:10000:0 | 0:1001:0 | |
| 23 | 1:01000:0 | 0:1001:0 | |
| 23A | 1:00100:0 | 0:0101:0 | |

FIG. 5C

| FRAME NUMBER | BAR | SPACE | PATTERN |
|---|---|---|---|
| 24 | 1:00100:0 | 0:1001:0 | |
| 24A | 1:00010:0 | 0:0011:0 | |
| 25 | 1:00010:0 | 0:0101:0 | |
| 25A | 1:00010:0 | 0:1001:0 | |
| 26 | 1:10000:0 | 0:0110:0 | |
| 26A | 1:01000:0 | 0:0110:0 | |
| 27 | 1:10000:0 | 0:1010:0 | |
| 27A | 1:01000:0 | 0:1010:0 | |
| 28 | 1:00100:0 | 0:0110:0 | |
| 28A | 1:00100:0 | 0:1010:0 | |
| 29 | 1:10000:0 | 0:1100:0 | |
| 29A | 1:01000:0 | 0:1100:0 | |
| 30 | 1:00100:0 | 0:1100:0 | |
| 30A | 1:00010:0 | 0:0110:0 | |
| 31 | 1:00010:0 | 0:1010:0 | |
| 31A | 1:00010:0 | 0:1100:0 | |
| 32 | 1:00001:0 | 0:0011:0 | |
| 32A | 1:00001:0 | 0:0101:0 | |
| 33 | 1:00001:0 | 0:1001:0 | |
| 33A | 1:00001:0 | 0:0110:0 | |
| 34 | 1:00001:0 | 0:1010:0 | |
| 34A | 1:00001:0 | 0:1100:0 | |
| 35 | 1:11100:0 | 0:0000:0 | |
| 35A | 1:11010:0 | 0:0000:0 | |
| 36 | 1:10110:0 | 0:0000:0 | |
| 36A | 1:01110:0 | 0:0000:0 | |
| E | 1:00000:0 | 0:1110:0 | |

FIG. 5D

| FRAME NUMBER | BAR | SPACE | PATTERN | EXPOSURES |
|---|---|---|---|---|
| 12' | 1::11001::0 | 0::0000::0 | | |
| 12A' | 1::10101::0 | 0::0000::0 | | 12 EXPOSURES |
| 20' | 1::01101::0 | 0::0000::0 | | |
| 20A' | 1::10011::0 | 0::0000::0 | | 20 EXPOSURES |
| 24' | 1::01011::0 | 0::0000::0 | | |
| 24A' | 1::00111::0 | 0::0000::0 | | 24 EXPOSURES |

PHOTOGRAPHIC FILM HAVING FRAME NUMBER BAR CODES

This is a continuation of application No. 07/941,328 filed Sep. 4, 1992 now abandoned, which is a divisional of application No. 07/826,191 filed Jan. 21, 1992, now U.S. Pat. No. 5,179,266, which is a continuation of 07/446,263 filed Dec. 5, 1989, now abandoned.

BACKGROUND OF THE INVENTION

The present invention relates to a photographic film and a method of reading a frame number of the photographic film, and more particularly to a photographic film with bar codes indicating frame numbers of the photographic film and a method of reading the bar codes of the photographic film.

A 135-type of roll film is attached with DX binary bar codes indicating the type of film, the speed of the film, or the like. The bar codes are latent images formed in a side margin of the film. Upon printing, the DX bar code is read with a bar code sensor or bar code reader to correct an exposure amount according to the film speed.

The roll film also is attached with main serial frame numbers indicated by decimal numbers and supplementary serial frame numbers indicated by decimal numbers and alphabetical letters arranged at regular intervals which are used to specify the respective frames upon printing. It is known to print a bar code indicating a frame number in addition to each serial frame number so as to read automatically the frame number for identifying a picture frame. The frame number bar code is used to locate automatically a frame in the exposure position for making an extra print of the frame and/or to print a frame number on the print.

Upon loading a roll film in a camera, withdrawing a film leader out of the film patrone reduces the exposures of the film. To make it possible to make as many exposures as assigned, the film is provided with an extra exposable part which is indicated by an identification sign or mark, such as a letter "E", as an extra frame number. For example, a roll film, having 12, 20, 24, or 36 frames, has an extra part or frame attached with an identification mark "E" after a frame number of "12A", "20A", "24A", or "36A", respectively.

In the roll film having an extra frame attached with frame number "E", the bar code reader sometimes erroneously reads the extra frame number "E" if the extra frame number "E" is scratched, has foreign articles, or fogged. As a result, distinguishing the last frame, such as a 12th, 20th, or 24th frame, from the extra frame "E" is difficult. However, because the longest roll film has 36 exposures, the last frame or 35th frame can be distinguished by storing data in the printer indicating that the extra frame "E" is after the 36th frame.

It is, therefore, an object of the present invention to provide a photographic film having frame number bar codes in which the last frame may be distinguished even when the frame number bar code for the last frame is read incorrectly. It is a further object to provide a method of reading frame number bar codes of the film.

SUMMARY OF THE INVENTION

To achieve the above and other objects, and advantages, the present invention provides a photographic film having a series of frames provided with bar codes which are read optically to identify frame numbers. At least one of the bar codes which gives a specific instruction other than the frame number is provided before the frame number bar code for a last frame of the photographic film. For example, a 12-exposure roll film is provided with a bar code with a specific instruction instead of a bar code indicating a frame number of "12A" for a twelfth frame. Adding a bar code indicating a frame number "EA" after a frame number "E" for the last frame also is possible.

A photographic film according to another preferred embodiment of the present invention is provided with a bar code indicating the number of available exposures in at least one of a leading, intermediate, and trailing portion thereof in addition to frame number bar codes which indicate decimal frame numbers. Because the photographic film enables the operator to know the arrangement of all frame numbers from the number of available exposures, even when a bar code for the last frame is not read, the bar code can be identified indicating the number for the last frame.

The present invention also provides a method of identifying frame numbers of frames of a photographic film which has bar codes indicating frame numbers attached to the respective frames thereof and a specific bar code indicating a specific part thereof which is located before or after the specific part of the photographic film. The method comprises the steps of reading each of the frame number bar codes to determine the decimal frame number of each frame of the photographic film, and then determining a frame in which the frame number bar code has failed to be read as the last frame of the photographic film when the specific bar code is read before or after failing to read the bar code of the last frame.

Because of the specific bar code other than bar codes indicating frame numbers located before and/or after a bar code indicating a frame number for the last frame, a bar code of a frame number for the last frame, even when it is not read, can be identified as being of the last frame number of "E".

BRIEF DESCRIPTION OF THE DRAWINGS

The above objects and advantages of the present invention will become more apparent from the following detailed description when read in conjunction with the accompanying drawings in which.

DETAILED DESCRIPTION OF THE INVENTION

Figure 1:
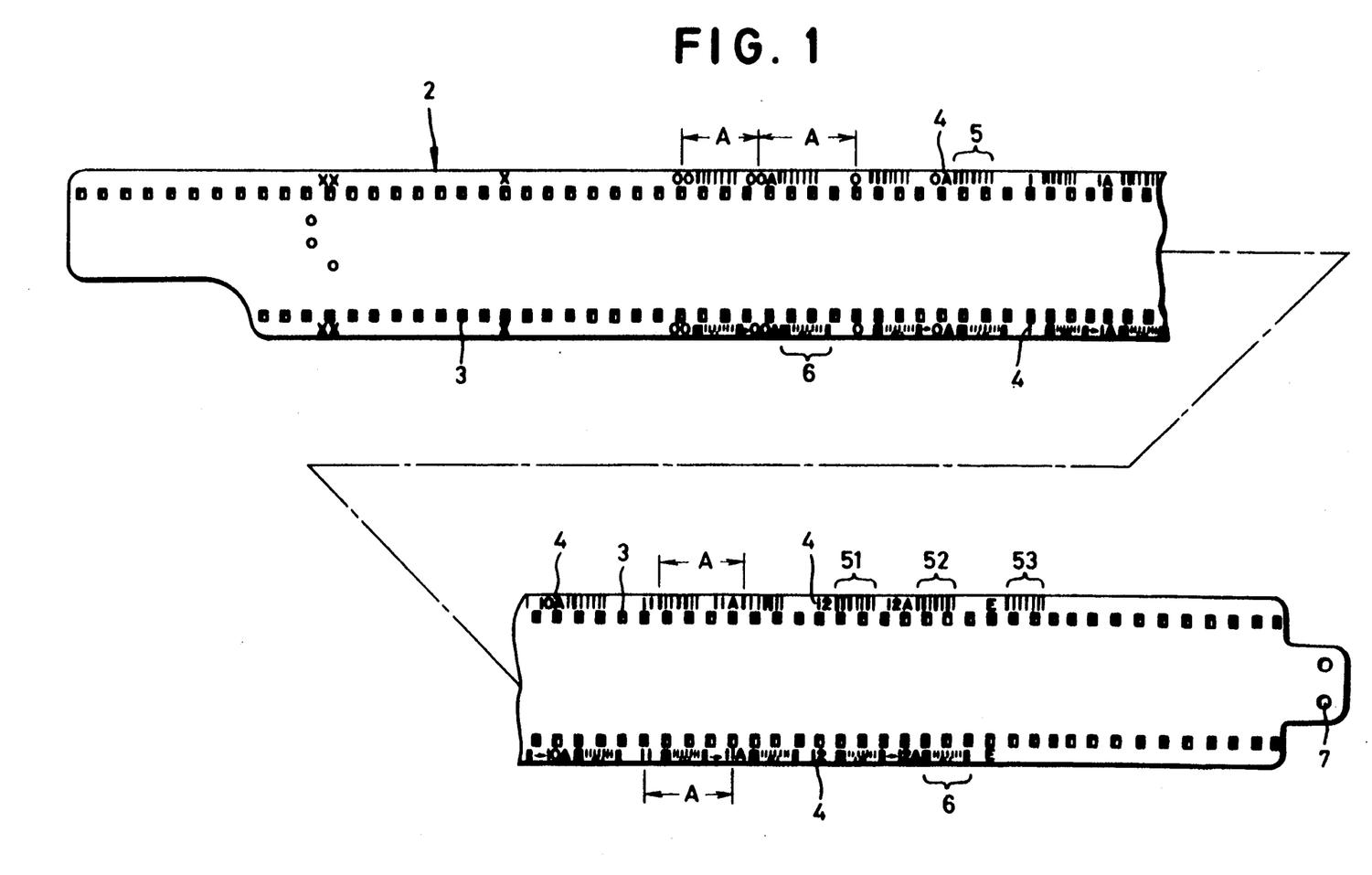
FIG. 1 is a partial illustration of a 12-exposure film according to a preferred embodiment of the present invention.

Referring now to FIG. 1, a 12-exposure roll film (which is referred to hereinafter simply as a film) 2 is partly shown. The film 2 is formed with a row of perforations 3 arranged at regular intervals in both side margins thereof. Between each side edge of the film 2 and each row of perforations 3, the film 2 is provided with frame numbers 4 comprising decimal numbers and alphabetical letters at regular intervals A. Additionally, between one side edge of the film 2 and a row of perforations 3, the film 2 is provided with frame number bar codes 5 indicating the frame numbers 4 at the regular intervals A. Moreover, between another side edge and another row of perforations 3, the film 2 is provided with DX bar codes 6 at regular intervals A. Formed in the trailing portion of the film 2 are holes 7 which are fitted in by a spool of a film container, such as a film patrone (not shown). These bar codes and frame numbers are printed as latent images and developed as visible images, and, therefore, they are shown in a visible form throughout several drawings for easy understanding. The film 2 is contained in the patrone with a leader portion partly withdrawn from the patrone.

Figure 4:
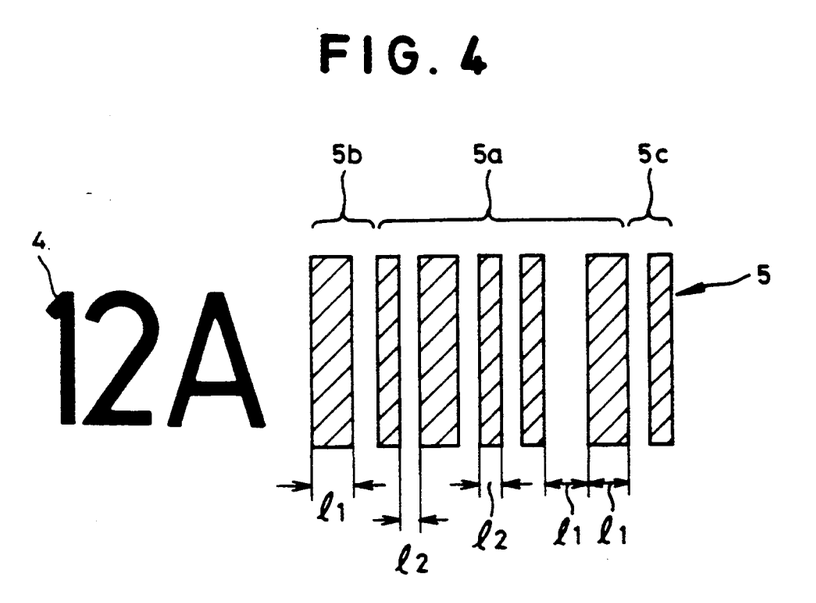
FIG. 4 is an explanatory illustration of a frame number bar code with a frame number.

Referring to FIGS. 4 and 5, the frame number bar code 5 will be described in detail hereinafter. As is well known in the art, various bar code systems are used in various fields. Although any one of these well known bar code systems can be used in this invention, the "Code 3 of 9" is used preferably. The "Code 3 of 9" bar code system consists of wide and narrow bars and blanks alternately arranged. The wide bar 1 or the wide spacing representing a binary number in 1's and the narrow bar 2 (having a half width of the wide spacing) or the narrow spacing (having a half width of the wide bar representing a binary number in 0's), includes five-bit data array 5a and entry and exit zones 5b and 5c disposed on both sides of the five-bit data array 5a, respectively, to allow the first and last bits of the data zone 5 to be identified. The frame number bar code 5 of the data zone 5a shown in FIG. 4 represents "100010001100" in the binary system and means "12A" in the decimal system. The five-bit data in the data zone 5a represents "00100011". The correspondence between frame number bar codes (indicated by a decimal number for convenience) and frame numbers is shown in tables in FIGS. 5A–5D.

Foreign articles or scratches attached to the bar code 53 of an end or last frame sign or number "E" for an extra frame (which is referred to as an extra frame number "E") will prevent an optical bar code reader from reading the extra frame number "E". However, if the optical bar code reader fails to read optically the extra frame number "E", it is impossible to identify whether the frame with the bar code 53 which the optical bar code reader has attempted to read is an extra frame of a 12-exposure roll film or a 13th frame of a 20-exposure, or a 24-exposure roll film. Accordingly, in this embodiment, the film is formed with a specific bar code as a frame number bar code for at least one frame before the extra frame. As such, the 12-exposure roll film 2 shown in FIG. 1 is formed with specific frame number bar codes 51 and 52 indicating specific frame numbers "12'" and "12A'" shown in FIG. 5D for the 12th frame in place of the frame number bar codes indicating frame numbers "12" and "12A" shown in FIG. 5B. These specific frame number bar codes indicate the exposed number of frames in addition to the frame numbers. Accordingly, when the optical bar code reader can read either one of the specific frame number bar codes 51 or 52, the frame with the frame number bar code read by the optical bar code reader is identified as the last frame of a 12-exposure roll film. With reference to decimal and specific frame number data stored as table data, it is certainly possible to determine the frame to be an extra frame, even when a bar code 53 of an extra frame number "E" is not read by the optical bar code reader. Accordingly, when printing the extra frame of the film 2, the print is printed with an extra frame number "E", so as to prevent printing an incorrect/impossible frame number, such as "13", on the print.

Figure 2:
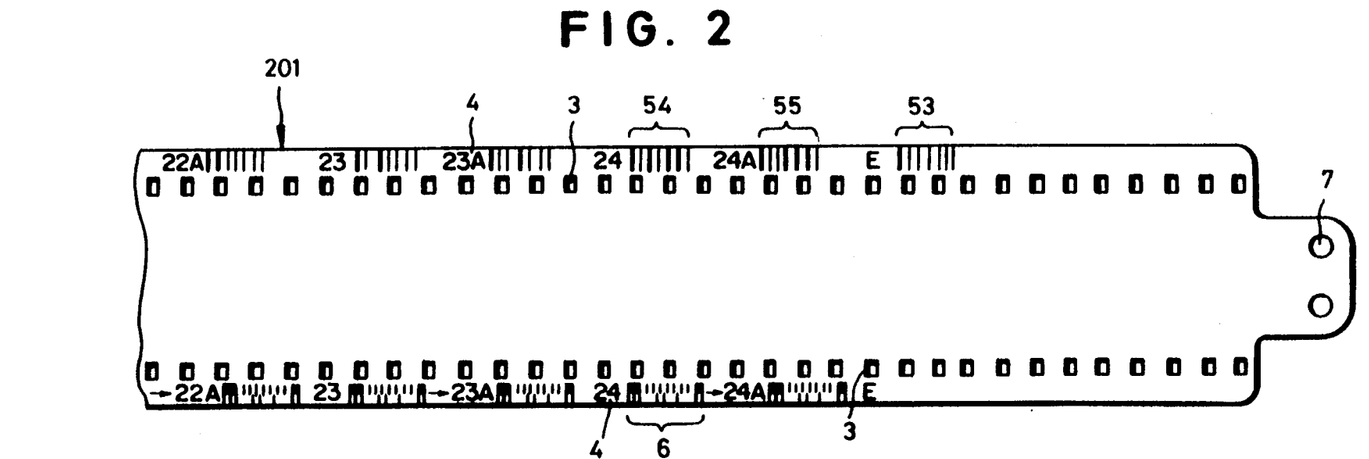
FIG. 2 is a partial illustration of a 24-exposure film according to a preferred embodiment of the present invention.
Figure 5A:
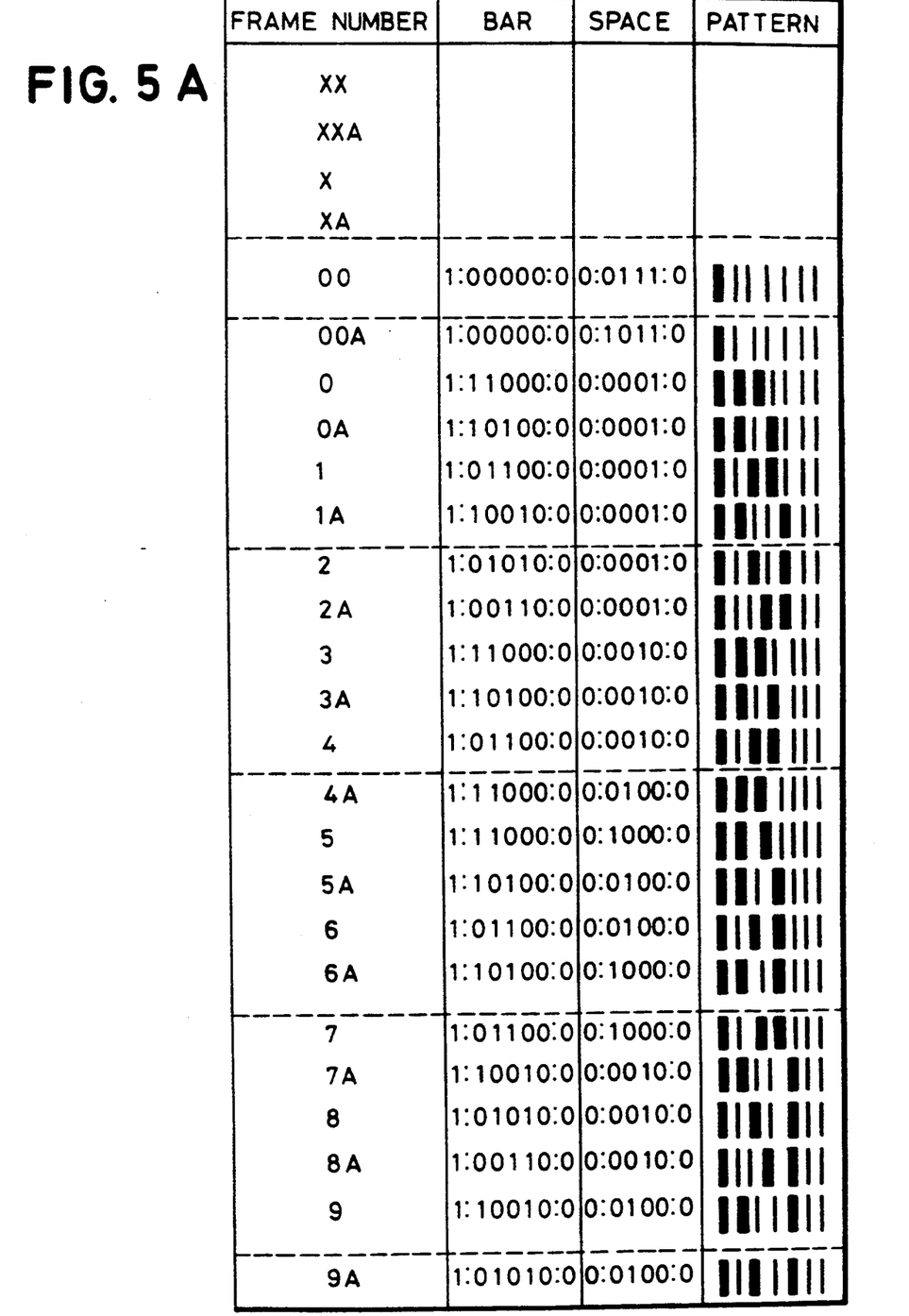
FIGS. 5A-5D are tables showing patterns of frame number bar codes.
Figure 5B:
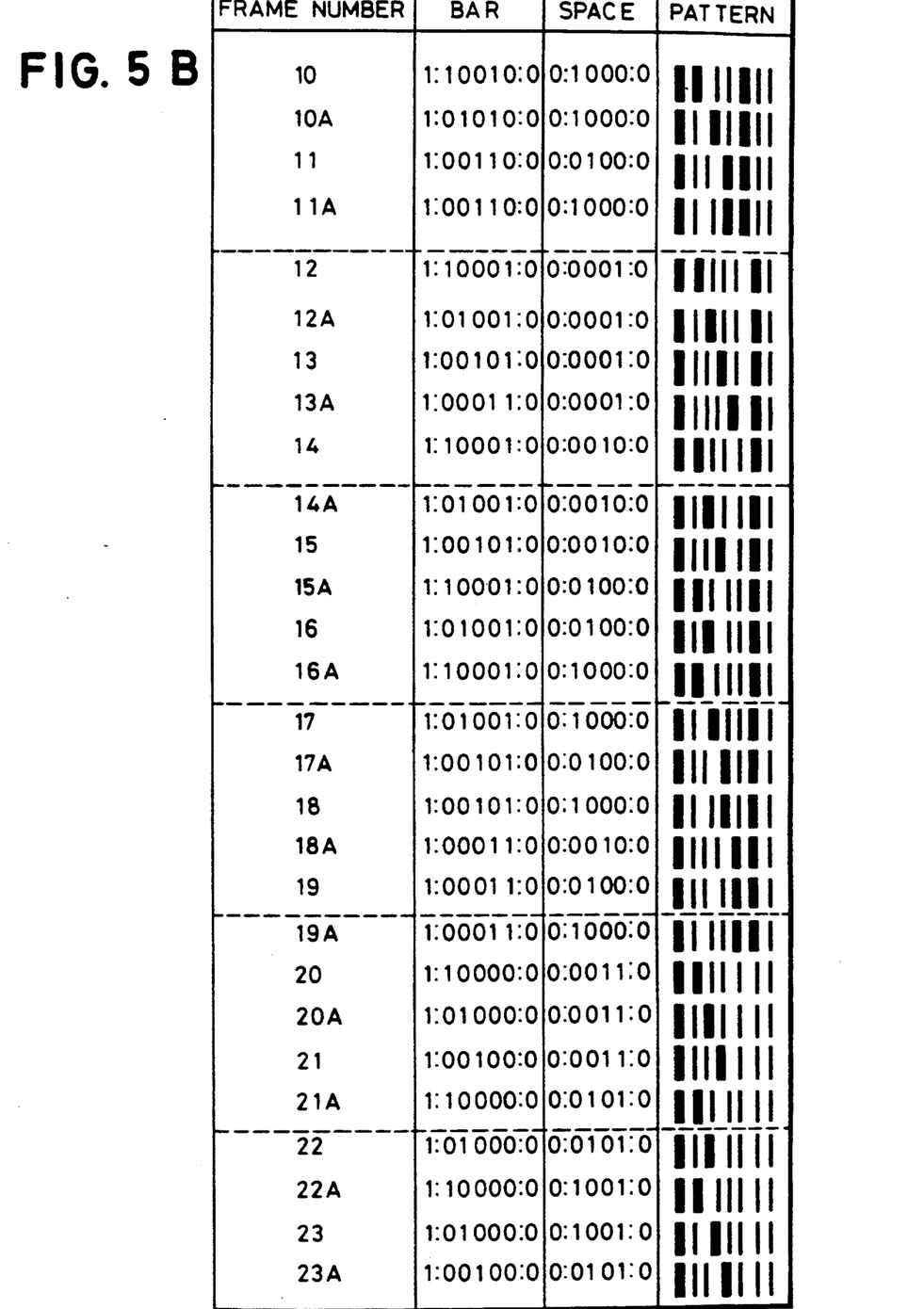
Figure 5C:
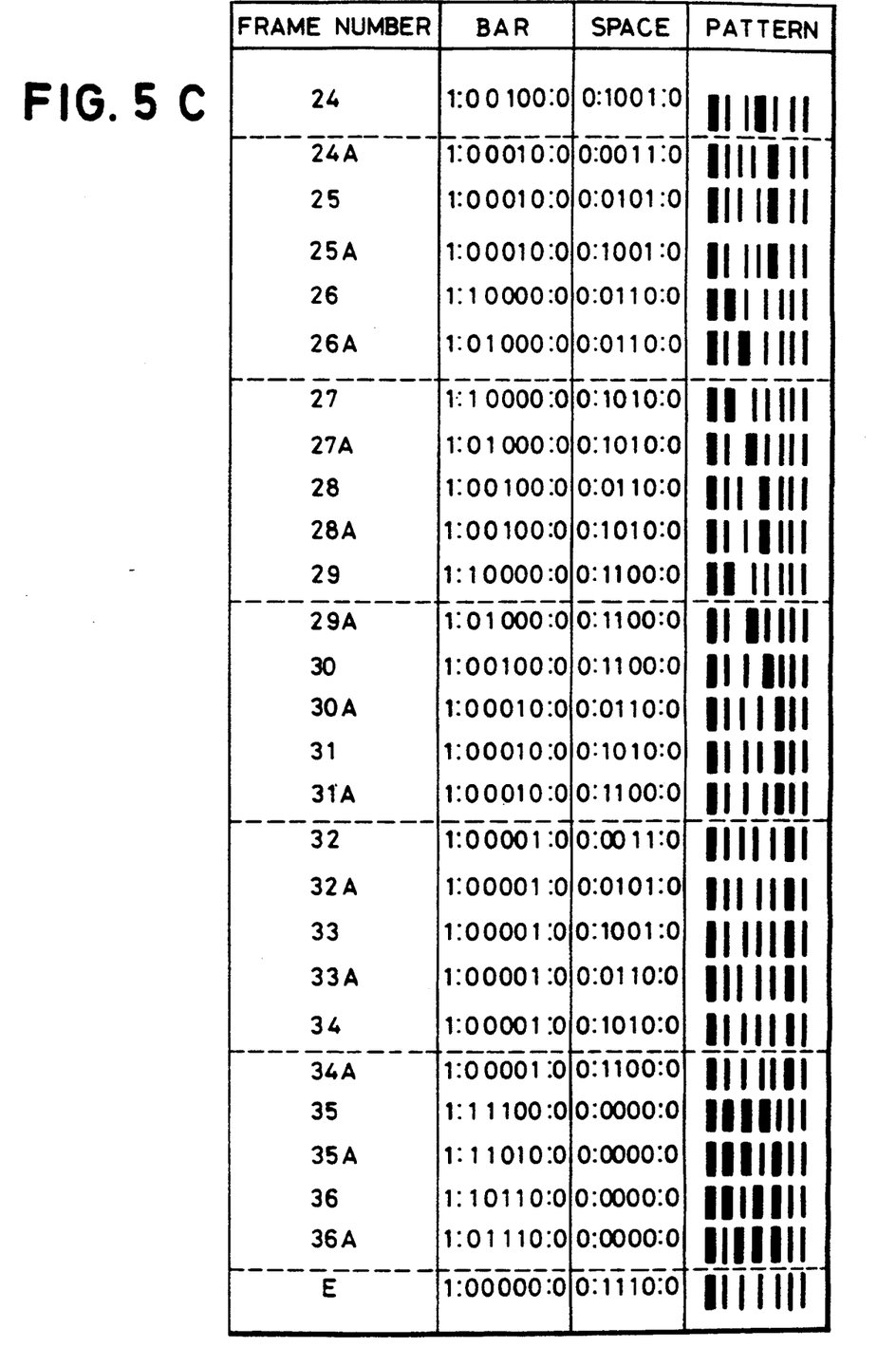
Figure 5D:
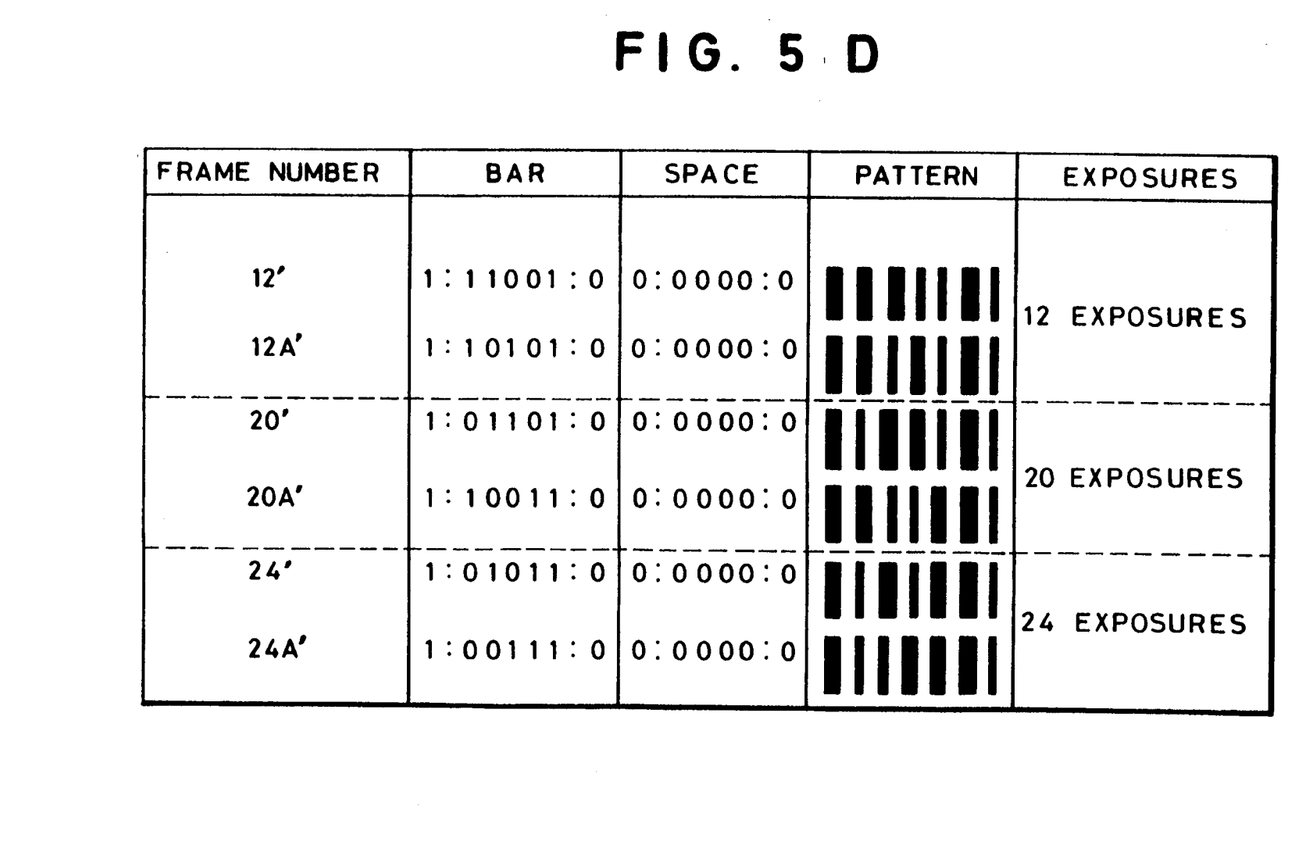

Referring to FIG. 2, a 24-exposure roll film 201 is shown according to a preferred embodiment of the present invention in which specific frame number bar codes 54 and 55 indicating specific frame numbers "24'" and "24A'" shown in FIG. 5D for the 24th frame are printed. Hence, decimal frame numbers 37 24" and "24A" are printed for the 24th frame.

Figure 3:
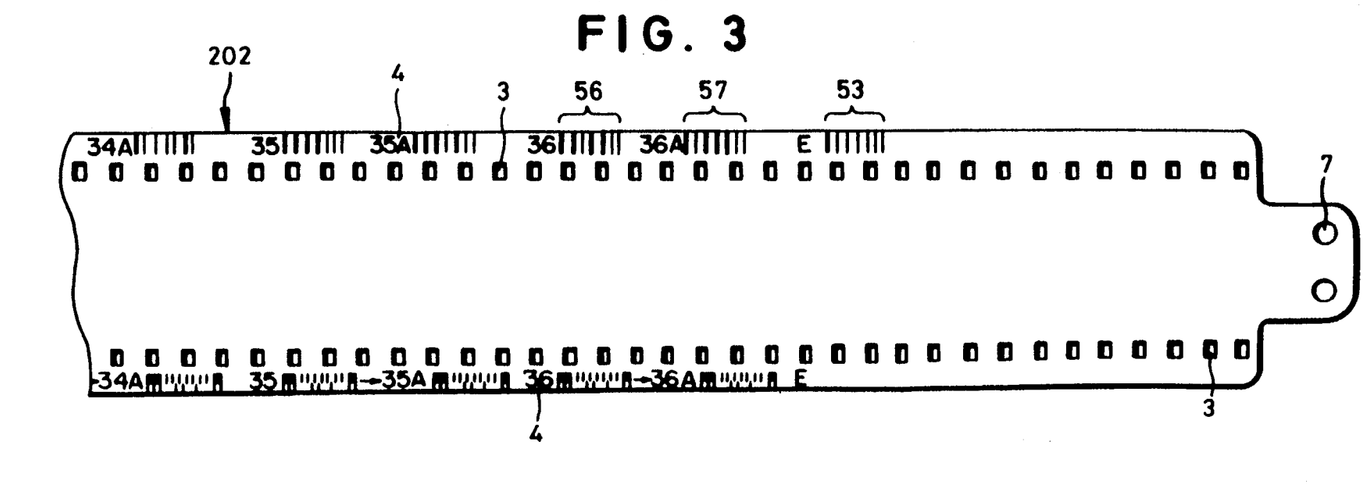
FIG. 3 is a partial illustration of a 36-exposure film according to a preferred embodiment of the present invention.

Referring to FIG. 3, a 36-exposure roll film 202 is shown according to a preferred embodiment of the present invention with frame number bar codes 56 and 57 for the 36th frame which do not indicate a specific frame number, but ordinary decimal frame numbers "36" and "36A" as shown in FIG. 5C since the greatest number of exposures of roll films now available commercially is 36 exposures and a frame next to the 36th frame is determined to be that of extra frame number "E". If new film rolls having more than 36 exposures are produced, then the decimal frame number bar codes 56 and 57 may be replaced with specific frame number bar codes indicating specific frame numbers "36'" and "36A'" for the 36th frame. Similarly, if 20-exposure roll film becomes commercially available, specific frame number bar codes indicating specific frame numbers "20'" and "20A'" shown in FIG. 5D can be printed for the 20th frame.

Figure 6:
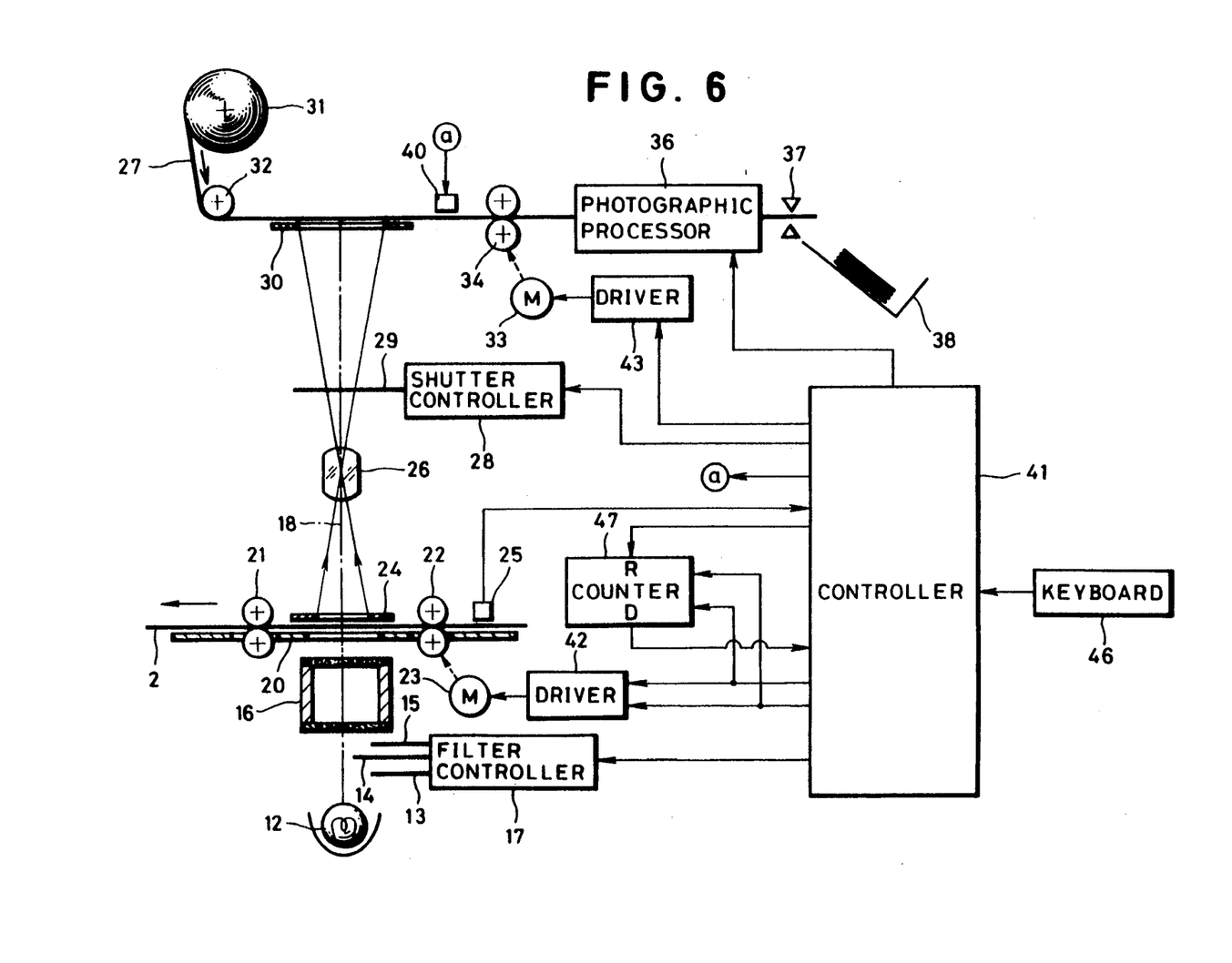
FIG. 6 is a schematic view showing a photographic printer with a frame number printing unit.

Referring to FIG. 5, there is shown a photographic color printer in which a method of specifying frame numbers of film according to the present invention is embodied. As shown, there are three complementary color filters 13, 14, and 15, representing cyan, magenta, and yellow, respectively. Each color filter 13, 14, and 15 is controllably insertable independently of the other two between a white illumination lamp 12 and a mixing box 16 which has a square hollow tube having inner mirrored walls 16a and top and bottom diffusion plates 16b. The white light from the lamp 12 passes through the color filters 13, 14, or 15 to regulate each color component of the white light into the mixing box 16 and is diffused thereby. The diffused light, after passing through a color negative film 2 placed between a film holder 20 and a film framing mask 24 so as to be held flat in the printing station, is focused on a color photographic paper 27 by a printing lens 26 to create a latent image of the negative film 2 under the control of a shutter 29 which is controlled by a shutter controller 28 to open and close. The negative film 2 is advanced from the left to the right relative to the printing station during film inspection, and from the right to the left during printing, respectively, by pairs of feed rollers 21 and 22 disposed on both sides of the printing station. The feed rollers 21 and 22 are rotated cooperatively in the normal or reverse direction by a pulse motor 23 through chains or the like. The film framing mask 24 is disposed over the film holder 20 at the printing station to press and flatten the negative film 2 down against the film holder 20. The film framing mask 24 has a framing aperture 24a formed therein to define an image area corresponding in size to the picture frame of the negative film 2, as is well known. The film framing mask 24 is lifted up and down by a solenoid (not shown) to allow the film 2 to move and to press the film 2 against the film holder 20 while it is inspected or printed. The bar code reader 25 is disposed after the feed rollers 22.

The printing lens 26 is disposed above the printing station to project a negative image of each picture frame of the negative film 2 onto the photographic paper 27. A framing mask 30 is disposed between the printing lens 26 and the photographic paper 27. The photographic paper 27 is withdrawn from a roll of photographic paper 31 by one picture frame, and advanced by a guide roller 32 and a pair of rollers 34 driven by a pulse motor 33. The exposed part of the photographic paper 27 is sent to a photographic processor 36 where it is photographically processed, cut into individual prints by a cutter 37, and delivered into a tray 38.

A number printer 40 actuated by printing signals from a controller 41 is disposed just after the exposure position to print frame numbers on the back of the photographic paper 27 after exposure. The frame number is printed, for example, in the form of a dot pattern. Instead of the number printer 40, a character printing unit such as having a liquid crystal panel, a light emission diode array, or the like can be used to print frame numbers of, for example, a dot pattern, in one white side margin of the photographic paper simultaneously with negative image printing. Alternatively, a character printing apparatus can be provided in addition to the photographic printing apparatus, which reads and stores frame numbers in a floppy disk or the like. The floppy disk and the developed photographic paper are set in the character printing apparatus to print the frame numbers on the developed photographic paper. Then, the photographic paper is cut into the respective prints.

The direction and the number of rotations of the pulse motors 23 and 33 are controlled by the drivers 42 and 43, respectively, under the control of the controller 41. The controller 41, comprising, for example, a microcomputer, controls the filter controller 17, the shutter controller 28, and other necessary elements, and also controls an exposure based on the large area transmittance density (LATD) of each picture frame. A keyboard or operating board 46 is used to input commands to the controller.

An up-down counter 47, which is connected to the controller 41, counts signals so as to measure the distance advanced of the entry bar 5b of the frame number bar code 5. The up-down counter 47 counts up or down drive pulses applied to the pulse motor 23, or drive pulses divided in frequency- To safeguard against a reading error, two up-down counters may be employed and alternately reset in synchronism with reading an entry bar 5b. If a frame is missing an entry bar 5b, the up-down counter is reset again upon reading an entry bar 5b for a subsequent frame. This allows the distance advanced of an entry bar 5b of a frame number bar code 5 last read to be measured. Perforation sensors for detecting the perforations 3 and a counter for counting signals provided by the perforation sensor also may be provided. Hence, the distance advanced of an entry bar 5a can be measured by the perforation counter and the up-down counter.

Figure 7:
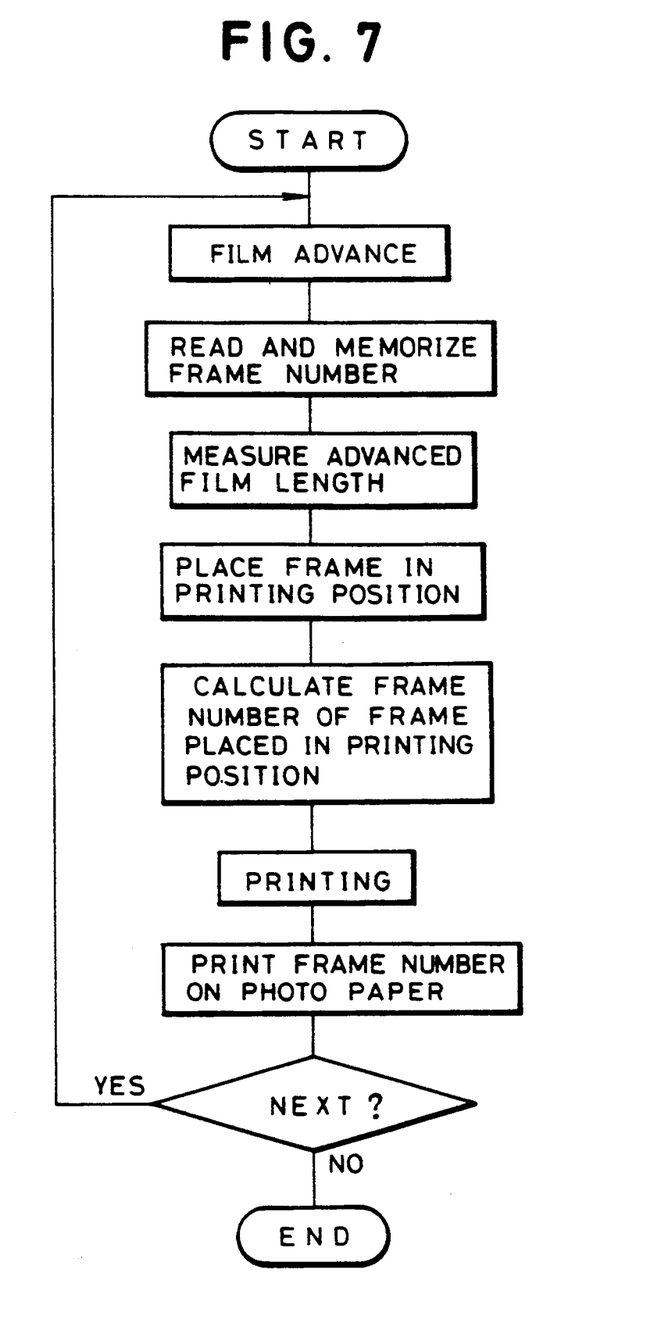
FIG. 7 is a flow chart showing a sequence of operations of the photographic printer shown in FIG. 6.

Operation of the photographic printer illustrated in FIG. 6 will be described with reference to FIGS. 7 and 8. After the negative film 2 has been threaded between the rollers 22, the controller 41 actuates a power switch (not shown) and provides drive pulses to the pulse motor 23. As a result, the pulse motor 23 rotates the rollers 22, thereby advancing the negative film 2 in a direction shown by an arrow in FIG. 6. As the negative film 2 is advanced, the bar code reader 25 optically reads one frame number bar code 5 printed on the side margin of the negative film 2, and provides the controller 41 with a code signal. The controller 41 decodes the code signal of the frame number bar code 5 and stores the decoded code signal in its self-contained memory. Simultaneously, the controller resets the counter 47 and actuates it to count drive pulses applied to the pulse motor 23. The counter 47 counts the drive pulses so as to determine a distance advanced of an entry bar of the frame number bar code 5 last read by the bar code reader 25.

When the bar code reader 25 reads another frame number bar code 5 next to the frame number bar code last read, the data of the last read frame number in the frame number memory is renewed with data of the frame number of another frame. As such, data of the frame number of a latest frame is stored in the memory The film 2 is positioned to place a frame to be printed in an exposure aperture in a well known manner such as transporting the film by a specified length, detecting the frame itself, or detecting a notch attached to the frame. When a print key on the keyboard 46 is depressed, a frame number 5 of the frame placed in the exposure position is calculated automatically. This calculation is made based on a distance between the bar code reader 25 and a center of the exposure aperture which is known previously, the regular intervals A at which the frame number bar codes are located, and a position to which a frame number bar code of the frame having been read has moved. For a detailed description of a representative example of such a calculation formula and a bar code reader, reference is made to Japanese Unexamined Patent application Nos. 63(1987)-45,563 and 63(1987)-45,564.

After the calculation of the frame number, the color filters 13–15 are inserted into the printing path 18 independently from one another according to exposures for three colors. Immediately thereafter, the shutter 29 opens to expose the color paper 27.

When the exposure of the paper 27 is completed, the controller 41 actuates the pulse motor 33 to start its rotation so as to advance one frame of the color paper 27 to place an unexposed part of the color paper 27 in the exposure position and the exposed part toward the photographic processor 36. After the color paper 27 has been advanced, the controller 41 actuates the number printer 40 to print the frame number of the printed frame of the film on the back of the exposed part of the color paper 27. The exposure and number printing are repeated for each exposed part of the color paper 27.

Figure 8:
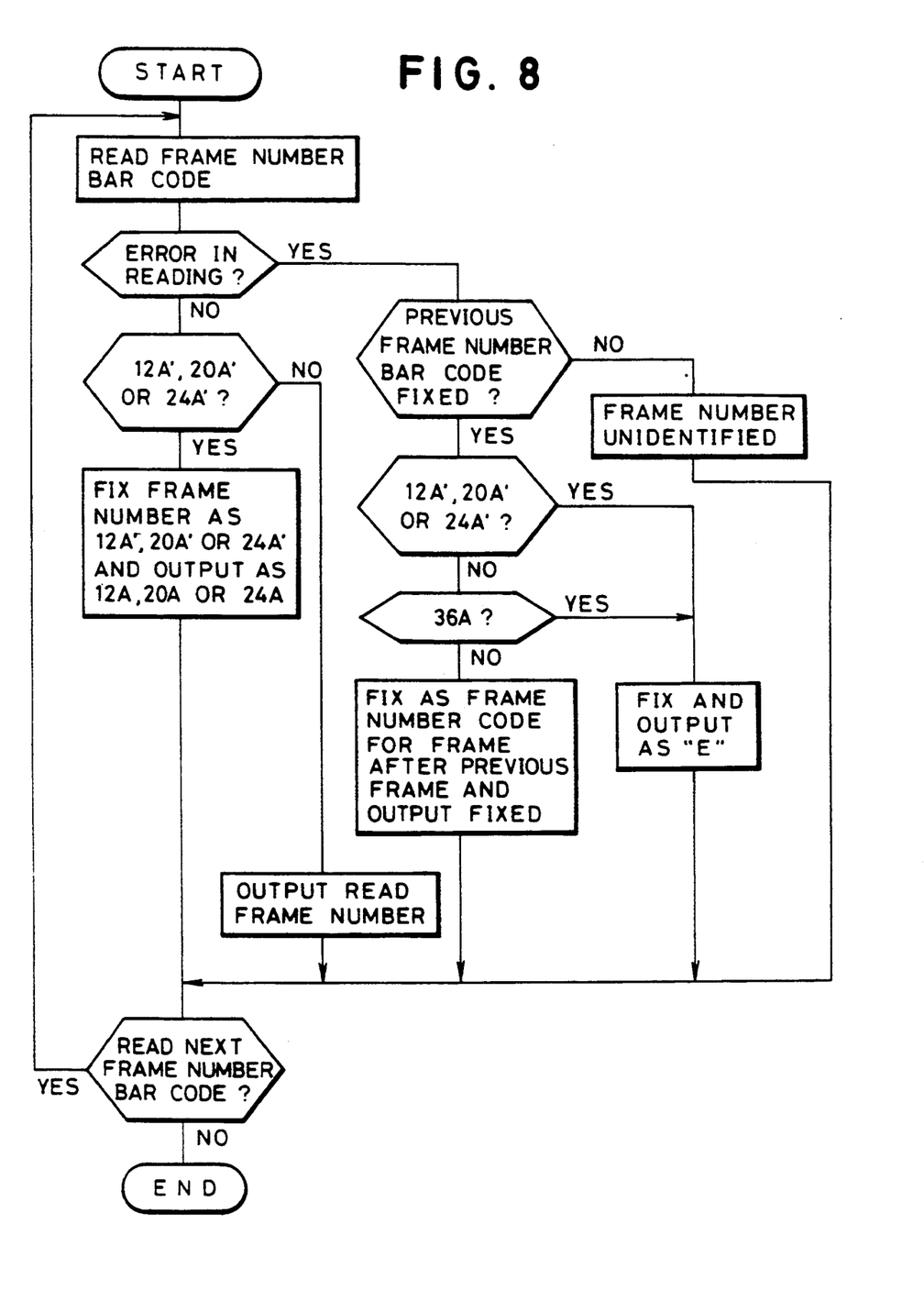
FIG. 8 is a flow chart showing procedures for fixing or definitely determining a frame number.

Referring to FIG. 8, a flow chart for determining frame numbers is illustrated. As described above, a frame number bar code data table displaying the relationship between decimal frame numbers and frame number bar codes (as shown in the tables of FIGS. 5A–5D) is stored in the memory of the controller 41. The controller 41 retrieves the frame number bar code data table to find the same bar code data as provided by the bar code reader 25, thereby determining a frame number.

Based on the data retrieved from the frame number bar code data table, it is determined whether the frame number is 12A', 20A', or 24A'. If the frame number of the frame in question is any one of these frame numbers, the controller 41 stores the data of a frame number of 12, 20, or 24 as a determined frame number for the frame number of 12A', 20A', or 24A' as stored in the memory. However, if the frame number of the frame in question is not one of the frame numbers 12A', 20A', and 24A', the controller 41 stores the bar code data provided by the bar code reader 25 as a determined frame number.

If no data is found in the frame number bar code data table, the bar code reader 5 is considered to have made an erroneous reading. Accordingly, it is determined whether a frame number of the previous frame of the film 2 has been determined. If it has not been determined, a number of the frame in question is deemed to be uncertain. Alternatively, if the frame number of the previous frame has been determined, it is determined whether the frame number of the previous frame is 12A', 20A°, or 24A'. If the previous frame number is any one of these frame numbers, the previous frame is determined to be an extra frame "E". If the previous frame s frame number is not 12A', 20A', and 24A', it is determined whether the frame number of the frame in question is 36A. the frame number is 36A, the frame in question is deemed to be an extra frame "E". Otherwise, it is determined that the frame in question has a frame number following the determined frame number of the previous frame.

Figure 9:
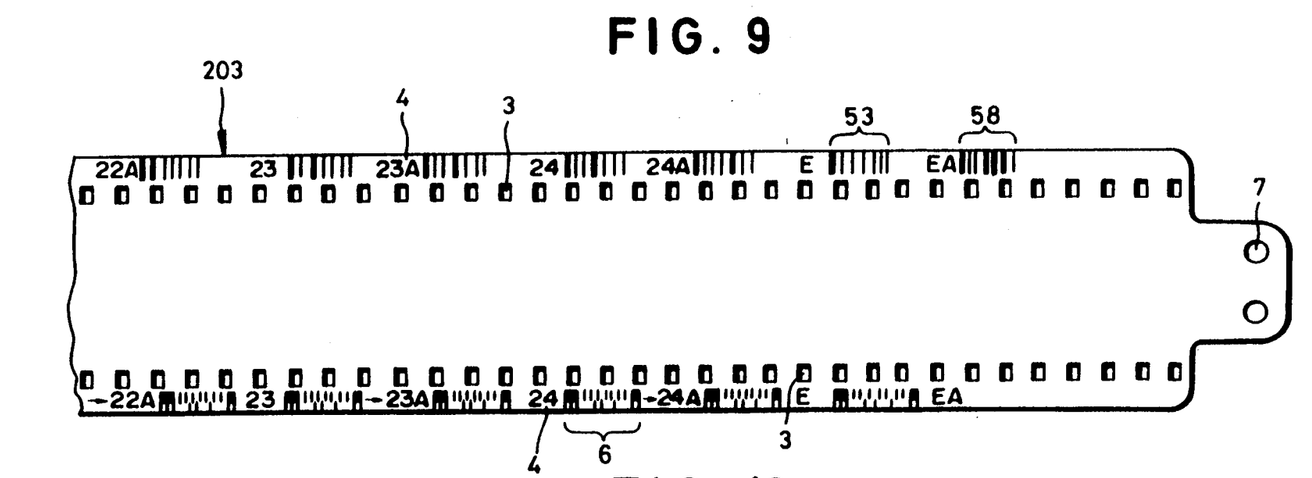
FIG. 9 is a partial illustration of a film according to another preferred embodiment of the present invention which is attached with a supplementary bar code after a frame number bar code for the last frame.

Referring to FIG. 9, a 24-exposure roll film according to another preferred embodiment of the present invention is shown. The 24-exposure roll film 203 is provided with a supplemental extra frame number "EA" signifying an additional extra frame after an extra frame number "E" and a specific frame number bar code 58 for the supplemental extra frame number "EA". The respective frames (i.e., 1–24) are identified by ordinary frame number bar codes as shown in FIGS. 5A–5C. In this embodiment with the provision of the specific frame number bar code 58, even if the bar code reader 25 fails to read a frame number bar code 53 of an extra frame of the film 203, the frame with its extra frame number "E" unread can still be recognized by reading the supplemental extra frame number bar code 58. The frame having the supplemental extra frame number "EA" is not available to record an optical image thereon. If prints from the film 203 are made in reverse numerical order of the frame numbers, the supplemental extra frame bar code 58 will be read first, and the extra frame can be identified even if the optical bar code reader fails to read the extra frame number bar code 53.

Figure 10:
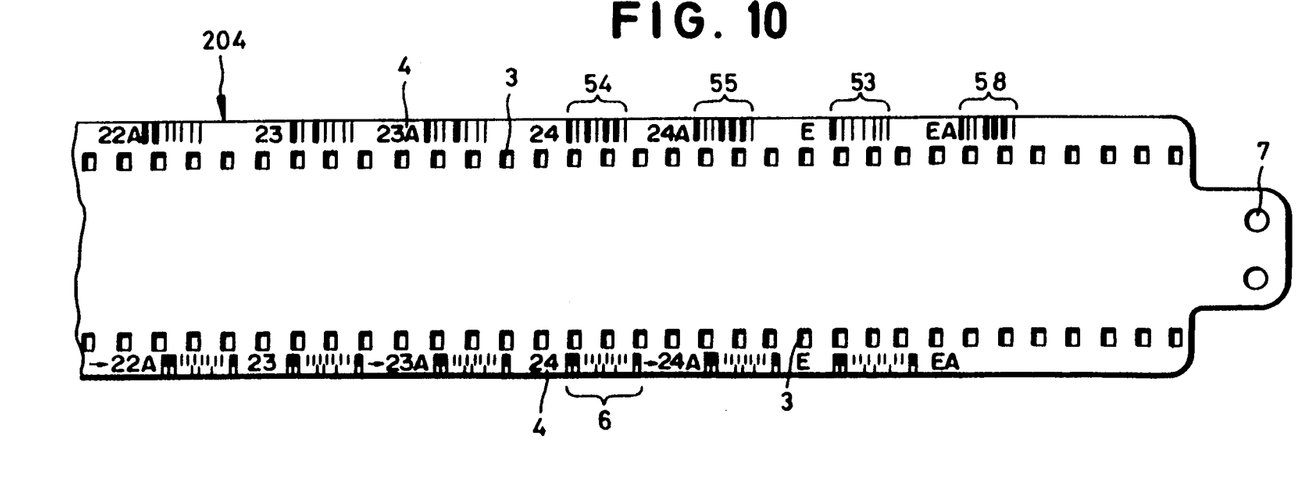
FIG. 10 is a partial illustration of a film according to still another preferred embodiment of the present invention which is attached with supplementary bar codes before and after the last frame.

Referring to FIG. 10, a 24-exposure roll film 204 is shown according to another preferred embodiment of the present invention which is provided with specific frame number bar codes 54, 55, and 58, such as those shown in FIGS. 2 and 9, before and after an extra frame number "E". Due to specific frame number bar codes being provided before and after the extra frame number "E", the bar code reader 25 reads the extra frame number "E" with high reliability.

Figure 11:
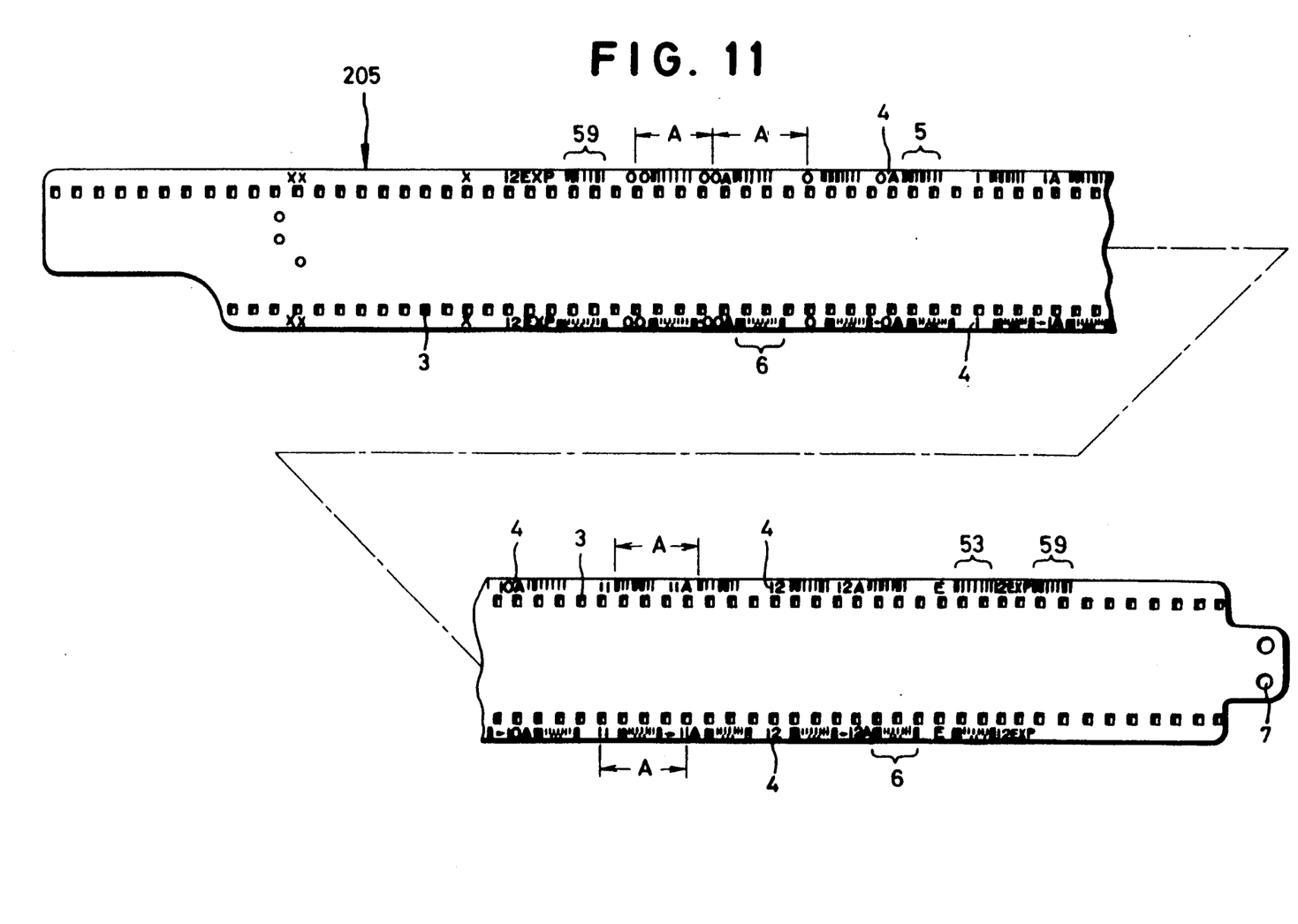
FIG. 11 is a partial illustration of a film according to yet another preferred embodiment of the present invention which is attached with supplementary bar codes near leading and trailing ends thereof.

Referring to FIG. 11, a 12-exposure roll film 205 is shown according to another preferred embodiment of the present invention which is provided with special instructions "12EXP" which indicate the number of available exposures and bar codes 59 indicating that the special instructions are located at the leading and trailing ends of the film. Since bar code 59 indicates the number of exposures of film 205 and, therefore, the frame number that the extra frame number is adjacent, the extra frame number "E" is recognized, even if the optical bar code reader 25 reads the bar code improperly or not at all. Preferably, a bar code 59 is provided at some locations between the available frames.

Although, in the frame number determining routine illustrated, for example, in the flow chart of FIG. 8, specific frame number bar codes are provided for two frame numbers, a specific frame number bar code provided for only one decimal frame number is sufficient. Furthermore, although in the frame number deciding routine illustrated, for example, in the flow chart of FIG. 8 prints are made from a film in increasing frame number order, the present invention is applicable to making prints from a film in decreasing frame number order. The embodiments shown in FIGS. 9 and 11 may be applied to roll films having any number of available exposures.

Although the present invention has been fully described in connection with the preferred embodiments thereof with reference to the accompanying drawings, it will be apparent to those skilled in the art that various changes and modifications of the present invention are possible within the scope of the following claims.

What is claimed is:

1. In a photographic film having a series of plurality of frame identifying bar codes which are printed on a lateral side at a predetermined pitch, said frame identifying bar codes representing a respective symbol identifying a picture frame to be formed by photography, said frame identifying symbols including serial numbers at least from "1" to "N" assigned serially to N frames to be arranged from a film leader end toward a film trailer end, and an extra symbol assigned to an extra frame disposed after said frame numbered as said N, where said N is a standardized number of available frames for exposure associated with a length of said photographic film, an improvement comprising:

a frame number bar code, for said N-numbered picture frame, signaling that a picture frame following said N-numbered picture frame is said extra frame, in addition to said number N.

2. An improvement as defined in claim 1, wherein said frame identifying symbols are printed adjacently to respectively associated said frame identifying bar codes.

3. An improvement as defined in claim 2, wherein said extra symbol is "E".

4. An improvement as defined in claim 3, further comprising:

sub-frame numbers disposed respectively behind a set of said number N and relevant said frame identifying bar code, and constituted by an addition of "A" to said number N, in order to identify a picture frame of a half size; and sub-frame identifying bar codes disposed adjacently to said sub-frame numbers for representing said sub-frame numbers.

5. An improvement as defined in claim 4, further comprising a plurality of DX bar codes for representing a film type, said DX bar codes printed at a predetermined pitch on a side opposite to said lateral side provided with said frame identifying bar codes and said frame identifying symbols.

6. In a photographic film having a series of a plurality of frame identifying bar codes which are printed on a lateral side of a predetermined pitch, said frame identifying bar codes representing a respective symbol identifying a picture frame to be formed by photography, said frame identifying symbols including serial numbers at least from "1" to "N" assigned serially to N frames to be arranged from a film leader end towards a film trailer end, and an extra symbol assigned to an extra frame disposed after said frame numbered as said N, where said N is a standardized number of available frames for exposure associated with a length of said photographic film, an improvement comprising:

a bar code disposed behind said frame identifying bar code associated with said extra symbol for representing a final symbol, said final symbol bar code signaling that a bar code preceding thereto represents said frame identifying bar code associated with said extra symbol.

7. An improvement as defined in claim 6, wherein said frame identifying symbols are printed adjacently to respectively associated said frame identifying bar codes.

8. An improvement as defined in claim 7, wherein said extra symbol is "E".

9. An improvement as defined in claim 8, wherein said final symbol is "EA".

10. An improvement as defined in claim 9, wherein said final symbol "EA" is printed adjacently to said final symbol bar code.

11. An improvement as defined in claim 10, further comprising:

sub-frame identifying symbols disposed respectively behind a set of said number N and relevant said frame identifying bar code, and constituted by an addition of "A" to said number N, in order to identify a picture frame of a half size; and sub-frame identifying bar codes disposed adjacently to said sub-frame identifying symbol for representing said sub-frame identifying symbols.

12. An improvement as defined in claim 11, further comprising a plurality of DX bar codes for representing a film type, said DX bar codes printed at a predetermined pitch on a side opposite to said lateral side provided with said frame identifying bar codes and said frame identifying symbols.

13. In a photographic film having a series of a plurality of frame identifying bar codes which are printed on a lateral side at a predetermined pitch, said frame identifying bar codes representing a respective symbol identifying a picture frame to be formed by photography, said frame identifying symbols including serial numbers at least from "1" to "N" assigned serially to N frames to be arranged from a film leader end toward a film trailer end, and an extra symbol assigned to an extra frame disposed after said frame numbered as said N, where said N is a standardized number of available frames for exposure associated with a length of said photographic film, an improvement comprising:

a bar code disposed in at least one of beginning, intermediate and ending positions of said series of said frame identifying bar codes for representing said standardized number N of available frames for exposure.

14. An improvement as defined in claim 13, wherein said frame identifying symbols are printed adjacently to respectively associated said frame identifying bar codes.

15. An improvement as defined in claim 14, wherein said extra symbol is "E".

16. An improvement as defined in claim 15, further comprising:

sub-frame numbers disposed respectively behind a set of said number N and relevant said frame identifying bar code, and constituted by an addition of "A" to said number N, in order to identify a picture frame of a half size; and sub-frame identifying bar codes disposed adjacently to said sub-frame numbers for representing said sub-frame numbers.

17. An improvement as defined in claim 16, further comprising a plurality of DX bar codes for representing a film type, said DX bar codes printed at a predetermined pitch on a side opposite to said lateral side provided with said frame identifying bar codes and said frame identifying symbols.

* * * * *